(12) United States Patent
Huettlin (10) Patent No.: US 7,866,284 B2
(45) Date of Patent: *Jan. 11, 2011

(54) OSCILLATING PISTON ENGINE

(76) Inventor: Herbert Huettlin, Daimlerstrasse 7, D-79585, Steinen (DE)

( * ) Notice: Subject to any disclaimer, the term of this patent is extended or adjusted under 35 U.S.C. 154(b) by 218 days.

This patent is subject to a terminal disclaimer.

(21) Appl. No.: 12/196,423

(22) Filed: Aug. 22, 2008

(65) Prior Publication Data

US 2009/0038581 A1 Feb. 12, 2009

Related U.S. Application Data

(63) Continuation of application No. PCT/EP2007/001488, filed on Feb. 21, 2007.

(30) Foreign Application Priority Data

Feb. 22, 2006 (DE) .................... 10 2006 009 198

(51) Int. Cl.
*F02B 53/00* (2006.01)
*F02B 75/00* (2006.01)
*F01C 1/00* (2006.01)
*F04C 18/00* (2006.01)
*F04C 2/00* (2006.01)

(52) U.S. Cl. .............. 123/18 R; 123/241; 123/245; 418/35; 418/36; 418/37; 418/38

(58) Field of Classification Search .......... 123/18 R, 123/241, 245; 418/34–38
See application file for complete search history.

(56) References Cited

U.S. PATENT DOCUMENTS 3,075,506 A 1/1963 Berry .................. 123/18 R (Continued)

FOREIGN PATENT DOCUMENTS

DE 10 2005 024751 A1 8/2006

(Continued)

OTHER PUBLICATIONS

International Search Report, Jun. 27, 2007 (3).

(Continued)

*Primary Examiner*—Thai Ba Trieu
(74) *Attorney, Agent, or Firm*—St. Onge Steward Johnston & Reens LLC (57) ABSTRACT

The invention relates to an oscillating piston engine comprising a housing that contains a first and at least a second piston, both of which can rotate about a fixed rotational axis in the housing and which when rotating about said axis execute counter-rotating displacements back and forth about a pivoting axis that runs perpendicular to the rotational axis through the centre of the housing. A working chamber is situated between opposing end faces of the first and at least second piston. The housing is provided with at least one gas exchange opening for admitting or discharging a gas into or from the working chamber. The pistons are arranged in such a way that the rotational axis runs through the working chamber. The pistons are mounted to slide in a piston cage, which is located in the housing, is concentric with the rotational axis, and rotates together with the pistons about said axis. The gas exchange opening is arranged eccentrically in relation to the rotational axis, on one end face of the housing.

14 Claims, 10 Drawing Sheets

U.S. PATENT DOCUMENTS

| | | | | |
|---|---|---|---|---|
| 3,169,487 | A | * | 2/1965 | Namikawa .................... 418/34 |
| 6,113,370 | A | * | 9/2000 | Volftsun ...................... 123/245 |
| 6,325,038 | B1 | | 12/2001 | Millett ........................ 123/241 |
| 7,258,082 | B2 | * | 8/2007 | Huettlin .................... 123/18 R |
| 7,658,168 | B2 | * | 2/2010 | Huettlin .................... 123/18 R |
| 2002/0170511 | A1 | | 11/2002 | Duke |
| 2005/0008515 | A1 | | 1/2005 | Huttlin |
| 2007/0209632 | A1 | | 9/2007 | Wagner ....................... 123/241 |
| 2008/0041225 | A1 | | 2/2008 | Huettlin |

FOREIGN PATENT DOCUMENTS

| | | |
|---|---|---|
| JP | 52037677 A | 3/1977 |
| WO | 03067033 A1 | 8/2003 |
| WO | 2005098202 A1 | 10/2005 |
| WO | 2006089576 A1 | 8/2006 |
| WO | 2006128545 A1 | 12/2006 |

OTHER PUBLICATIONS

International Preliminary Report on Patentability & Written Opinion of the International Searching Authority, PCT/EP2007/001488, Oct. 23, 2008, 8 pages.

\* cited by examiner

Fig. 10

OSCILLATING PISTON ENGINE

CROSS-REFERENCE TO RELATED APPLICATIONS

The present application is a continuation of pending international patent application PCT/EP2007/001488 filed on Feb. 21, 2007 which designates the United States, and which claims priority of German patent application no. 10 2006 009 198.1 filed on Feb. 22, 2006.

BACKGROUND OF THE INVENTION

The invention generally relates to oscillating piston engines. More specifically, the present invention relates to an oscillating piston engine of the type having a housing in which a first and at least a second piston are arranged which can jointly revolve in the housing about an axis of rotation which is fixed in relation to the housing, and which perform when revolving about the axis of rotation reciprocating pivoting movements in opposite directions relative to one another about a pivot axis running through the center of the housing perpendicularly to the axis of rotation, wherein a working chamber is arranged between mutually facing end surfaces of the first and at least second piston, and which further comprise at least one gas exchange opening in the housing for admitting or discharging a gas into or from the working chamber.

Oscillating piston engines and in particular an oscillating piston engine according to the present invention can be used as internal combustion engines, as pumps or as compressors. An oscillating piston engine according to the present invention is preferably used as an internal combustion engine and is described as such in the present description.

In the case of the use of an oscillating piston engine as an internal combustion engine, the individual working strokes of admitting, compressing, expanding and expelling are imparted by reciprocating pivoting movements of the individual pistons between two end positions.

In the case of the oscillating piston engine known from document WO 03/0670333 A1 from the same Applicant, four pistons are arranged in the spherical housing which jointly revolve about an axis of rotation which is central to the housing and fixed in relation to the housing and perform when revolving in the housing reciprocating pivoting movements about a pivot axis, each two adjacent pistons pivoting in opposite directions. In the case of this known oscillating piston engine, each two pistons diametrically opposing the center of the housing are rigidly connected to each other to form a double piston, and two such pairs of pistons are arranged crosswise in the center of the housing. A respective working chamber is formed between each two mutually facing end surfaces of the pistons of the pairs of pistons, so that the known oscillating piston engine has a total of two working chambers. Both working chambers, which are arranged diametrically opposing the center of the housing, increase and decrease in size in the same direction during the reciprocating pivoting movement of the pistons.

The pistons of this known oscillating piston engine are arranged in the housing in such a way that they are located in their TDC position, in which the volumes of the two working chambers are minimal, perpendicularly to the axis of rotation. In this position, as the pistons revolve about the axis of rotation, the centrifugal forces acting on the pistons are maximal. As a result, at high rotational speeds, the expanding or the pivoting-apart of the pistons must take place counter to the centrifugal forces, because the centrifugal forces counteract the pivoting-apart movement of the pistons. In the case of this oscillating piston engine, the working chambers are located in all cases outside and perpendicularly to the axis of rotation.

Furthermore, the known oscillating piston engine has in the housing two gas exchange openings, which are arranged at an angular distance of approximately 100° from one another relative to the axis of rotation. One gas exchange opening serves to admit combustion air and the other gas exchange opening serves to expel the combusted fuel/air mixture. A spark plug is arranged on the side of the axis of rotation opposing the gas exchange openings, for example on the bisector of an angle between the two gas exchange openings.

An oscillating piston engine which is comparable to the above-described known oscillating piston engine is known from document WO 2005/098202 A1. As in the case of the above-described known oscillating piston engine, admission pressure chambers are associated with the backs of the pistons that are remote from the working chambers. For flooding the admission pressure chambers with atmospheric fresh gas, intake openings are provided in the housing, and for flooding the working chambers with precompressed fresh gas, the admission pressure chambers are connected to the working chambers via a connection opening and via an overflow channel. The output shaft located on the axis of rotation is provided on its end face with rotary slide valves which each have two opposing windows which can be drawn together with the intake openings and with the connection opening, wherein on rotation of the shaft through 180° alternately all four windows clear the intake openings and two of the windows clear the connection openings of the overflow channels. The actual gas exchange openings, which are associated with the working chambers, are provided with controlled valves, and this increases the design costs. This known approach of providing a control disc rotating about the axis of rotation or a rotary slide valve is known, in the case of a comparable oscillating piston engine, also from document U.S. Pat. No. 6,325,038 B1.

SUMMARY OF THE INVENTION

The invention is based on the object of specifying an oscillating piston engine which breaks with the approach for arranging the pistons of the known oscillating piston engine, and which in this case also allows the gas exchange of the working chambers to be controlled in a simple manner in terms of design.

According to the invention, an oscillating piston engine is provided, comprising a housing having a center and having an end face, a first and at least a second piston arranged in the housing, the first and at least second piston having mutually facing end surfaces, the first and at least second piston being able to jointly revolve in the housing about an axis of rotation which is fixed in relation to the housing, and to perform, when revolving about the axis of rotation, reciprocating pivoting movements in opposite directions relative to one another about a pivot axis running through the center of the housing perpendicularly to the axis of rotation, a working chamber arranged in the housing between the mutually facing end surfaces of the first and at least second piston, the axis of rotation running through the working chamber, a piston cage arranged in the housing concentrically with the axis of rotation, the first and at least second piston being slidingly mounted in the piston cage, the piston cage being able to rotate together with the first and second piston about the axis of rotation, and at least one gas exchange opening arranged in the housing for admitting or discharging a gas into or from the working chamber, the at least one gas exchange opening being arranged eccentrically with respect to the axis of rotation on the end face of the housing, the axis of rotation running through the end face of the housing, the piston cage having an end face opposing the end face of the housing and having an eccentric opening delimited in direction of revolution about the axis of rotation.

In the case of the oscillating piston engine according to the invention, the at least two pistons are therefore arranged in such a way that the working chamber is located not perpendicularly to the axis of rotation, but rather on the axis of rotation or around the axis of rotation. Owing to the shorter spacing of the pistons from the axis of rotation, the centrifugal forces acting, during revolving about the axis of rotation, on the two pistons delimiting the working chamber are lower and also act in the direction of the pivoting-apart of the two pistons, i.e. the centrifugal forces assist the expanding working stroke. Furthermore, the at least one gas exchange opening is now arranged no longer, as in the case of the known oscillating piston engine, in a housing region far apart from the axis of rotation, but rather on the end face of the housing, directly associated with the working chamber located on the axis of rotation. The flow of the working gas through the at least one gas exchange opening is thus directed substantially axially to the axis of rotation. In order to achieve simple control, in particular without valves, of the exchange of gas into or from the working chamber, the piston cage in which the pistons are mounted to slide has a full-area end face which runs along the inside of the end face of the housing as the piston cage rotates. Present in the end face of the piston cage is a, viewed in the direction of revolution, delimited eccentric opening which, as the piston cage revolves about the axis of rotation, communicates or does not communicate, depending on the revolving position, with the gas exchange opening in the end face of the housing. In this way, it is advantageously not necessary to provide the at least one gas exchange opening with an actively controlled valve, because the valve function is performed by the opening in the end face of the piston cage. When the eccentric opening in the end face of the piston cage is not aligned with the gas exchange opening, the working chamber is sealed from the gas exchange opening, for example during compressing or expanding of the fuel/air mixture.

In a preferred configuration, the gas exchange opening widens in opening cross section from an outside toward an inside of the end face of the housing.

The advantage of this measure is that owing to the opening cross section of the gas exchange opening, which is larger on the inside at the end face of the housing, the opening in the end face of the piston cage can be kept small, and an adequate exchange of gas can nevertheless take place as the opening of the piston cage passes the gas exchange opening in the housing.

In a further preferred configuration, a maximum clear width of the gas exchange opening extends, viewed in the direction of revolution about the axis of rotation, over an angle of revolution of more than 30° and less than 90°.

The advantage of this measure is that a complete exchange of gas is brought about by the at least one gas exchange opening in an angle of revolution range of less than 90°.

In a further preferred configuration, a second gas exchange opening is arranged eccentrically on the end face of the housing, the at least one gas exchange opening serving to discharge a gas from the working chamber and the second gas exchange opening to admit a gas into the working chamber, and the opening in the end face of the piston cage communicating when revolving about the axis of rotation successively, but without a time overlap, with the at least one and the second gas exchange opening.

In the case of this configuration, two gas exchange openings are accordingly provided in the end face of the housing, one of which serves to admit a gas, for example combustion air or fuel/air mixture, and the other to discharge a gas, for example combusted fuel/air mixture. Viewed in the direction of revolution of the pistons, the opening in the end face of the piston cage runs first past the gas exchange opening for discharging the gas from the working chamber and subsequently past the gas exchange opening for admitting a gas into the working chamber. The gas exchange openings are in this case arranged in relation to the dimensions of the opening in the end face of the piston cage so as to allow the opening of the piston cage to communicate at all times only with one of the two gas exchange openings, while the other is covered by the remaining full-area end face of the piston cage. Overall, this configuration has the advantage of allowing the admission of a gas into the working chamber and the discharging of a gas from the working chamber to be controlled in a simple manner in terms of design without the need for additional control valves.

In relation to the above-mentioned configuration, it is furthermore preferred if the at least one gas exchange opening for discharging gas is arranged, viewed in the direction of revolution of the piston cage, before the second gas exchange opening for admitting gas.

This measure has the advantage that the arrangement of the gas exchange openings corresponds to the natural respiration principle of the working chambers defined by the two pistons. The process of the discharging or expelling of combusted fuel/air mixture is carried out, in the case of a pivoting movement of the two pistons directed toward each other, until the working chamber between the two pistons is minimized. After the expulsion of combusted fuel/air mixture, new combustion air can now be admitted or drawn into the working chamber, optionally together with fuel, as the two pistons again pivot apart from each other, during which process the working chamber again increases in size, immediately after the complete expulsion of the combusted fuel/air mixture. This combined process of expelling the combusted fuel/air mixture and admitting fresh combustion air or fuel/air mixture can advantageously take place in an angular range of less than 180° of the revolving movement of the pistons or the piston cage about the axis of rotation.

Furthermore, it is preferred if the at least one gas exchange opening and the second gas exchange opening are separated from each other, viewed in the direction of revolution of the piston cage, by a web which is at least slightly broader than the breadth of the opening of the piston cage, the web extending, viewed in the direction of revolution, over an angle of from approximately 20° to approximately 60°, preferably over an angle of from approximately 40° to approximately 50°.

In the case of this configuration, the two gas exchange openings are accordingly arranged, viewed in the direction of revolution about the axis of rotation, close together and separated from each other merely by the web. The breadth of the web must merely be broader than the opening of the piston cage to ensure gas-tight separation of the two gas exchange openings as the piston cage revolves about the axis of rotation. Overall, there is obtained a control mechanism which is very simple in terms of design for the exchange of gas into and from the working chamber, requiring just two openings in the end face of the housing that are eccentric with respect to the axis of rotation and one eccentric opening in the end face of the piston cage.

In a further preferred configuration, between the end face of the housing and the end face of the piston cage is a sealing arrangement having at least one seal which seals the at least one gas exchange opening from the end face of the piston cage.

This measure has the advantage that the at least one seal in the positions of revolution of the piston cage about the axis of rotation, in which the opening of the piston cage does not communicate with the at least one gas exchange opening, ensures that no gas is exchanged into or from the working chamber, thus allowing high working pressures to be achieved in the working chamber during compression of the fuel/air mixture and during expansion of the fuel/air mixture after ignition thereof. In the simplest case, the at least one seal is arranged on the circumference of the at least one gas exchange opening and nestles against the end face of the piston cage.

It is preferred if the sealing arrangement is provided on the piston cage and has a radially outer ring seal based on the axis of rotation, optionally a radially inner ring seal and at least two at least approximately radially extending seals which are set apart from one another in the circumferential direction, are connected to the ring seals and arranged on both sides of the opening of the piston cage.

The radially outer ring seal and the optionally provided radially inner ring seal cause sealing of the at least one gas exchange opening from the remaining interior of the housing, while the two approximately radially extending seals seal the opening of the piston cage from the end face of the housing. The two ring seals and the two radial seals slide along the inside of the end face of the housing as the piston cage revolves.

In a further preferred configuration, the sealing arrangement has more than two at least approximately radially extending seals which are preferably distributed uniformly about the axis of rotation in the direction of revolution.

The advantage of this measure is that as a result of the provision of a plurality of radial seals, the sealing effect is further improved, and that uniform abutment of the sealing arrangement as a whole against the inside of the end face of the housing is also achieved.

The sealing arrangement as a whole, comprising the ring seals and the radial seals, can in particular be embodied in one piece and be introduced in a correspondingly configured groove in the outside of the end face of the piston cage. In order to achieve uniform contact pressure of the sealing arrangement against the end face of the housing, the sealing arrangement can be acted on in the end face of the piston cage with spring force which presses the sealing arrangement against the end face of the housing.

In a further preferred configuration, there is present in the end face of the housing a further, centric opening and in the end face of the piston cage also a further, centric opening.

There may now advantageously be inserted in the centric opening of the end face of the housing a spark plug or glow plug which can then exert an influence into the working chamber through the centric opening in the end face of the piston cage, which opening communicates with the centric opening of the end face of the housing.

The aforementioned radially inner ring seal should then be provided to seal the at least one gas exchange opening from the centric opening in the end face of the piston cage.

In a further preferred configuration, the end surfaces of the pistons have a trough-like depression in a region facing the end face of the piston cage.

The depression causes the pistons to ensure a finite working chamber volume even in the TDC position, in which the pistons are pivoted maximally toward one another, resulting in an optimum configuration of an initial combustion trough. At the start of the working stroke after the ignition of the fuel/air mixture, the explosion which takes place in this combustion trough acts on the pistons with maximum leverage, as the depressions in the aforementioned configurations are at the greatest distance from the swivel axis and thus form a large lever arm on the piston.

Further advantages and features will emerge from the following description and the appended drawings.

It will be understood that the features which have been mentioned hereinbefore and will be further described hereinafter can be used not only in the respectively specified combination, but rather also in other combinations or in isolation, without departing from the scope of the present invention.

BRIEF DESCRIPTION OF THE DRAWINGS

An exemplary embodiment of the invention is illustrated in the drawings and will be described hereinafter in greater detail with reference to said drawings, in which.

DETAILED DESCRIPTION OF THE INVENTION

FIG. 1 to 4 show an oscillating piston engine provided with general reference numeral 10. Further details of the oscillating piston engine 10 are shown in FIG. 5 to 10.

The oscillating piston engine 10 is generally designed as an internal combustion engine but, modified accordingly, can also be used as a pump or as a compressor.

Figure 1:
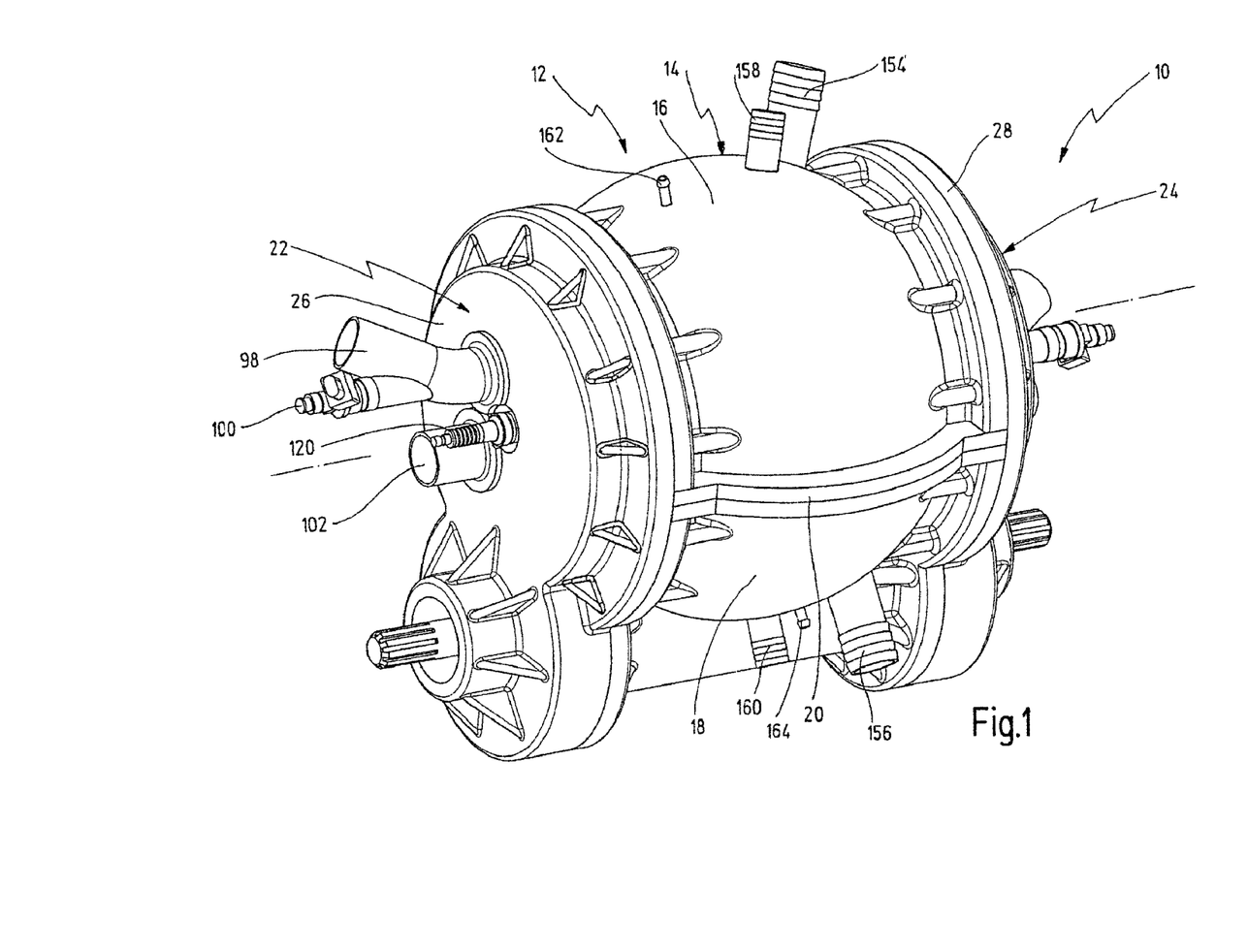
FIG. 1 is a perspective overall view of an oscillating piston engine.

The oscillating piston engine 10 has a housing 12 which in FIG. 1 is shown closed. The housing 12 has a central housing portion 14 which is spherical in its formation. The central housing portion 14 is composed of two housing halves 16 and 18 which are joined together via a flange 20.

The housing 12 also has a first end face 22 and a second end face 24 opposing the first end face 22.

The first end face 22 is formed by an end-face housing lid 26 and the second end face 24 by an end-face housing lid 28. The housing lids 26 and 28 are connected to the central housing portion 14 or the housing halves 16 and 18 thereof. The housing lids 26 and 28 can be detached from the central housing portion 14, just as the housing half 16 can be detached from the housing half 18.

Figure 2:
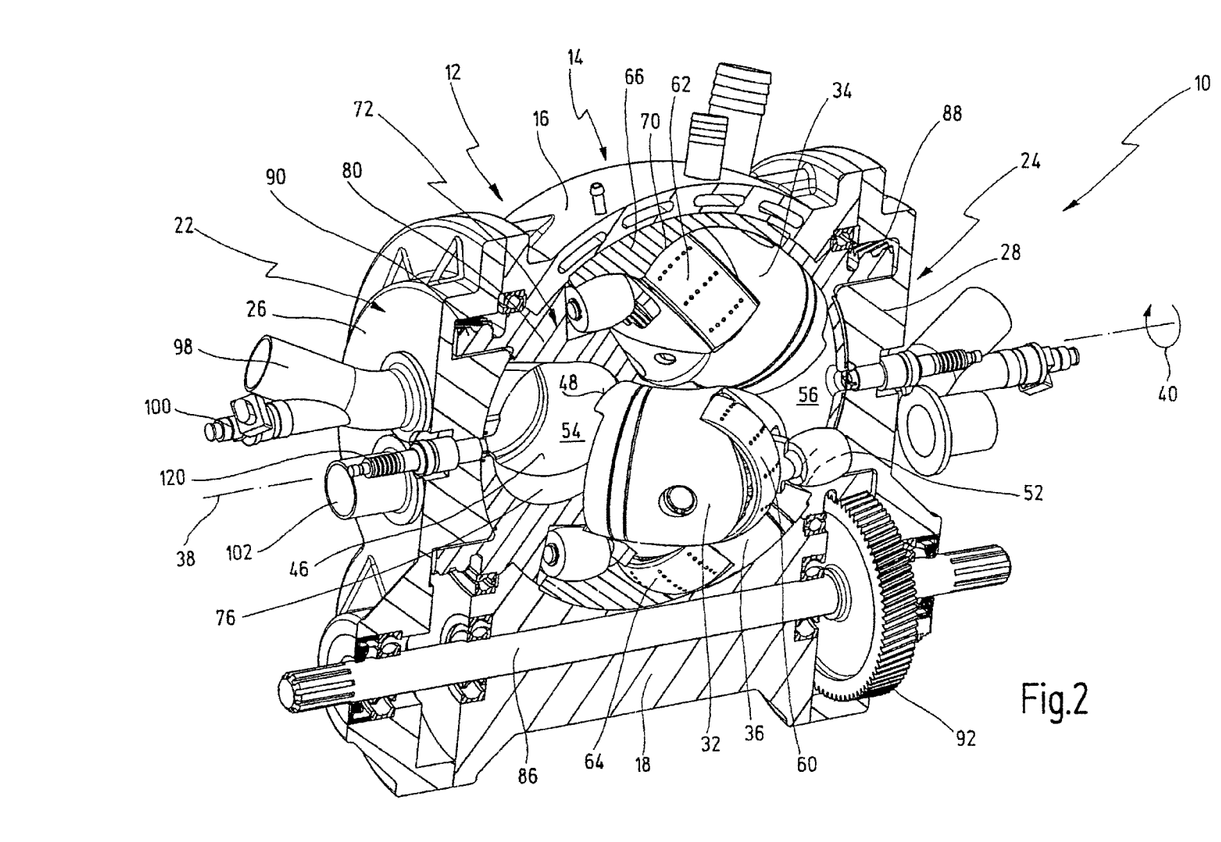
FIG. 2 is a longitudinal section of the oscillating piston engine in FIG. 1, the pistons being shown in a first pivoting end position (BDC position)
Figure 3:
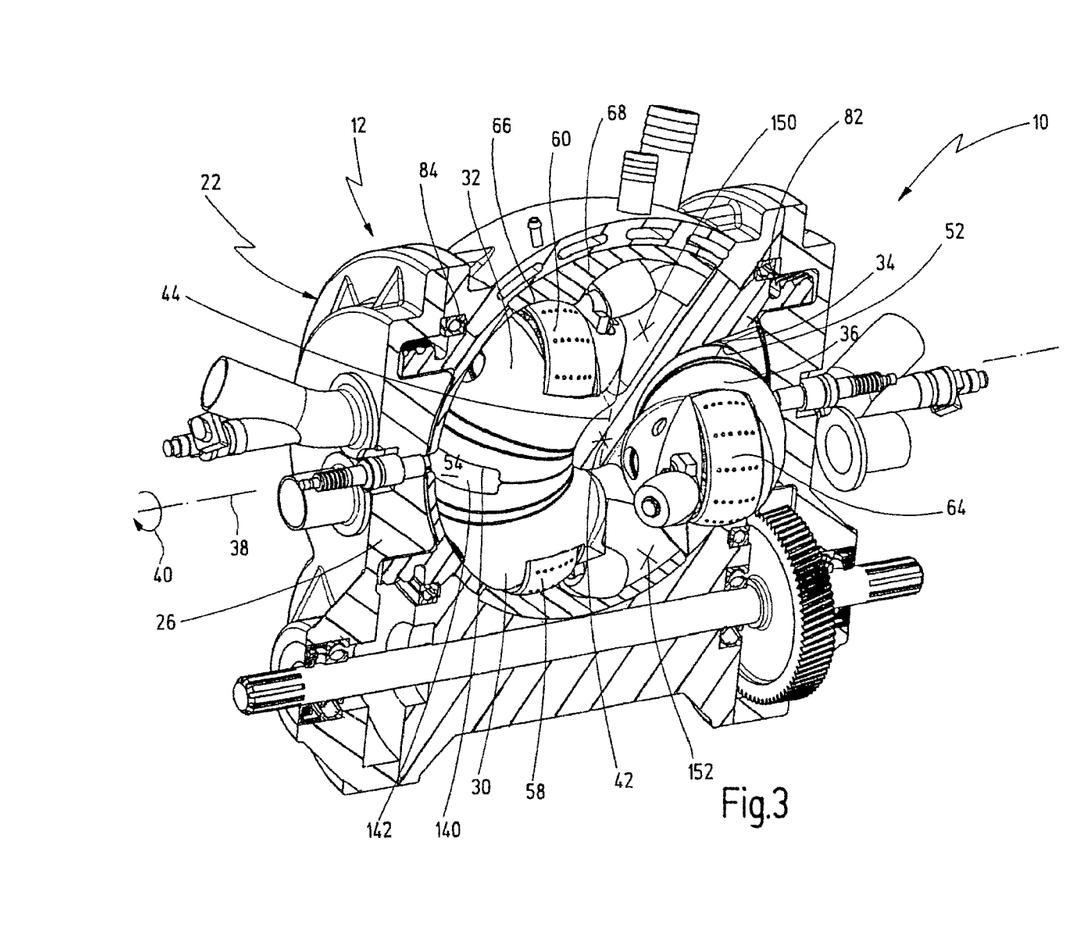
FIG. 3 shows the oscillating piston engine in FIG. 1 in the same section as in FIG. 2, the pistons now being shown in a second pivoting end position (TDC position)
Figure 4:
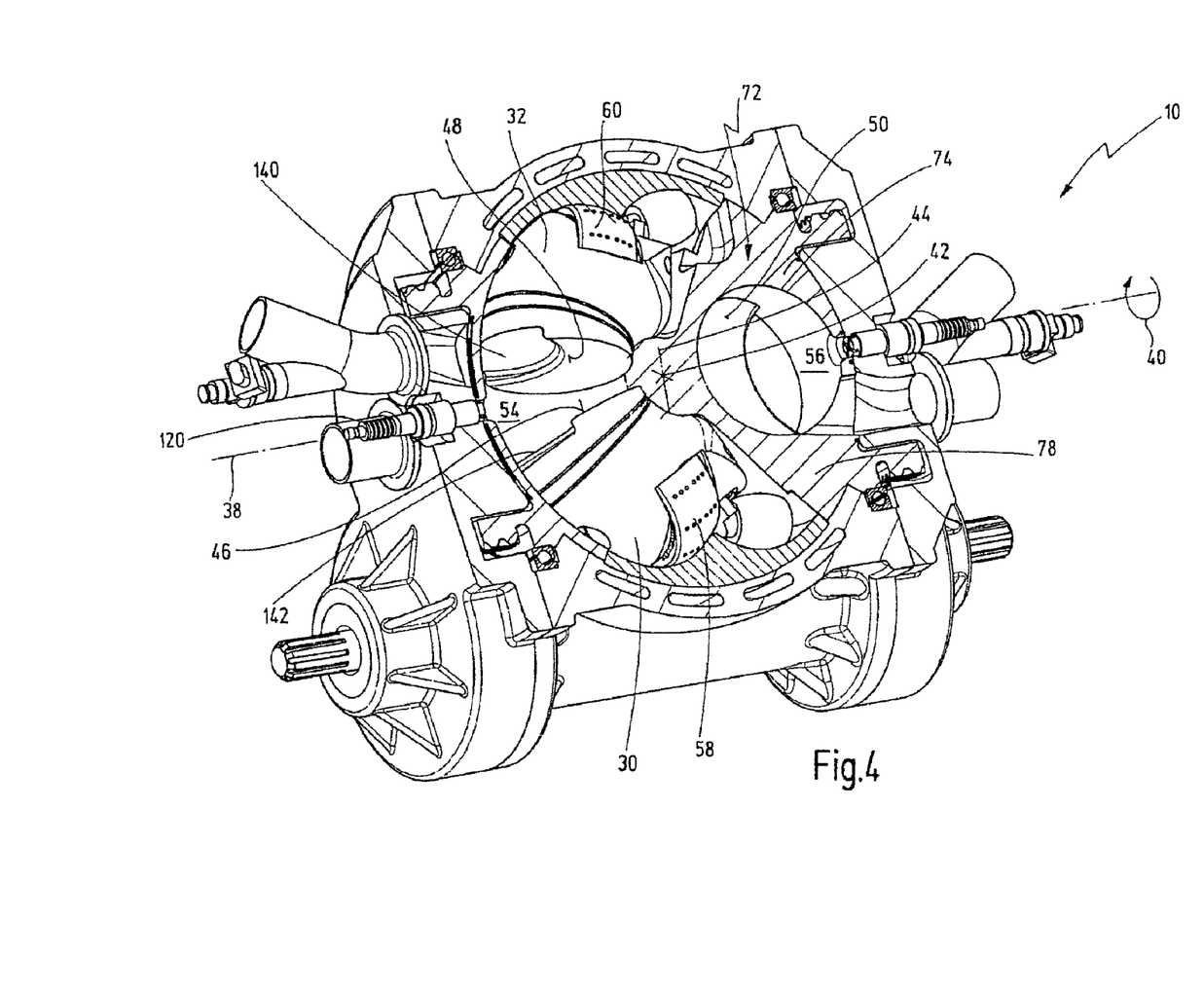
FIG. 4 is a further longitudinal section of the oscillating piston engine in FIG. 1, the sectional plane in FIG. 4 being tilted through approximately 45° in relation to the sectional plane in FIGS. 2 and 3, and the pistons being shown in a pivoting position located approximately centrally between the positions in FIG. 2 and in FIG. 3.

According to FIGS. 2 to 4, four pistons 30, 32, 34, and 36 are arranged in-side the housing 12. The pistons 30, 32, 34, and 36 can revolve in the housing 12 jointly about an axis of rotation 38 in the direction indicated by an arrow 40. The axis of rotation 38 passes through the center of the spherical interior of the housing 12 and is fixed in relation to the housing, i.e. does not change its position relative to the housing 12 as the pistons 32, 34, and 36 revolve.

The pistons 30, 32, 34, and 36 perform as they revolve about the axis of rotation 38 a pivoting movement which is superimposed on the revolving movement. The pistons 30 and 32 perform in this case reciprocating pivoting movements about a first pivot axis 42 which perpendicularly intersects the axis of rotation 38 at the center of the interior of the housing 12, while the pistons 34 and 36 perform as they revolve about the axis of rotation 38 reciprocating pivoting movements about a second pivot axis 44 which perpendicularly intersects the axis of rotation 38 likewise at the center of the interior of the housing 12, but is also located perpendicularly to the pivot axis 42. The pivot axes 42 and 44 revolve with the pistons 30, 32, 34, and 36 likewise about the axis of rotation 38. The instantaneous pivot plane of the pistons 30 and 32 is in this case located at all times perpendicularly to the instantaneous pivot plane of the pistons 34 and 36.

It is however also possible for all four pistons 30, 32, 34, and 36 to be arranged in a common plane and for the pivot axes 42 and 44 to be parallel or coincide.

Both the axis of rotation 38 and the pivot axes 42 and 44 are in this case to be understood as geometric axes.

The pivoting movements of the pistons 30 and 32 or 34 and 36 are carried out between two end positions, one end position being shown in FIG. 2 (what is known as the BDC position) and the other end position in FIG. 3 (what is known as the TDC position).

The pivoting movements of the pistons 30 and 32, on the one hand, and the pistons 34 and 36, on the other hand, are in all cases in the same direction, i.e. when the pistons 30 and 32 pivot apart from each other, the pistons 34 and 36 also pivot apart from each other, and vice versa.

Each of the pistons has an end surface, i.e. the piston 30 has an end surface 46, the piston 32 has an end surface 48, the piston 34 has an end surface 50 and the piston 36 has an end surface 52, the view onto said end surface 52 being obscured in FIG. 2 by another component.

The pistons 30 and 32 form a first pair of pistons, the end surfaces 46 and 48 of which face each other. The end surfaces 46 and 48 define a first working chamber 54. The pistons 34 and 36 form a second pair of pistons, the end surfaces 50 and 52 of which face each other and define a second working chamber 56. The volumes of the working chambers 54 and 56 increase and decrease in size in accordance with the reciprocating pivoting movements of the pistons 30 and 32 or 34 and 36, the working chambers 54 and 56 increasing or decreasing in size in all cases in the same direction.

The pistons 30, 32, 34, and 36 are arranged in the housing 12 in such a way that the axis of rotation 38 passes through both working chambers 54 and 56, preferably centrally in each revolving and pivoting position of the pistons 30, 32, 34, and 36.

In order to generate the pivoting movements of the pistons 30, 32, 34, and 36 during the revolving movement thereof about the axis of rotation 38, each piston has a running element: the piston 30 a running element 58 (FIGS. 3 and 4), the piston 32 a running element 60 (cf. FIGS. 2 to 4), the piston 34 a running element 62 (cf. FIG. 2) and the piston 36 a running element 64 (cf. FIGS. 3 and 4). The running elements 58, 60, 62 and 64 are in this case formed as rollers, each running element 58, 60, 62 and 64 being rotatably fastened to the associated piston 30, 32, 34, and 36. A first control cam 66, which is formed on a control cam member 68, is associated with the running elements 58 and 60 of the pistons 30 and 32. A second control cam 70 on the control cam member 68 is associated with the running elements 62 and 64 of the pistons 34 and 36.

The running elements 58 and 60 accordingly run along the same control cam 66, and the running elements 62 and 64 along the same control cam 70.

The control cams 66 and 70 are formed around the axis of rotation 38 over their entire circumference and have a contour or cam guide allowing the pivoting movement of the pistons 30 and 32 or 34 and 36 to be derived from the revolving movement thereof about the axis of rotation 38.

Figure 5:
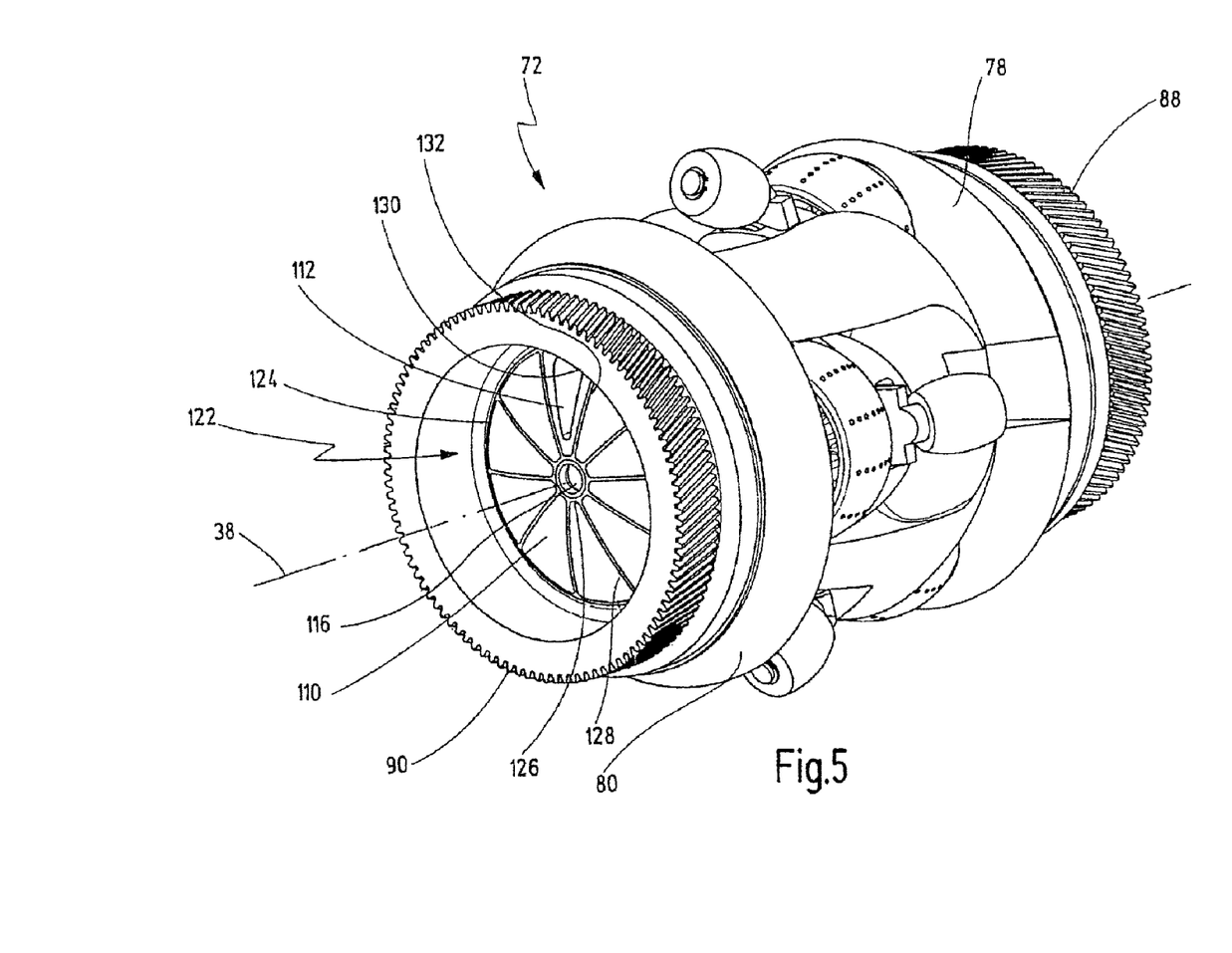
FIG. 5 is a perspective view of a piston cage of the oscillating piston engine in FIG. 1 to 4 including pistons received therein.

The pistons 30, 32, 34, and 36 are mounted to slide in the housing 12 in a piston cage 72 which revolves about the axis of rotation 38 in conjunction with the pistons 30, 32, 34, and 36 and is shown in FIG. 5 together with the pistons 30, 32, 34, and 36, but without the housing 12. In the piston cage 72, the pistons are prevented from turning or tilting, for example by means of tongue-and-groove connections (not shown).

The piston cage 72 has according to FIG. 4 a bore 74 associated with the pistons 34 and 36 and according to FIG. 2 a bore 76 associated with the pistons 30 and 32. The pistons 34 and 36 are mounted to slide in the bore 74, and the pistons 30 and 32 are mounted to slide in the bore 76. Together with the end surfaces 46 and 48 of the pistons 30 and 32, the bore 76 delimits the working chamber 54, and the bore 74 delimits the working chamber 56 together with the end surfaces 50 and 52 of the pistons 34 and 36. Owing to the arrangement, staggered through 90°, of the pistons 30 and 32 relative to the pistons 34 and 36, bores 74 and 76 are also formed perpendicularly to each other in the piston cage 72.

The bores 74 and 76 are provided in a respective main bearing portion 78 (bore 74) and main bearing portion 80 (bore 76). Via the main bearing portions 78 and 80, the piston cage 72 is mounted in the housing 12 so as to be able to rotate about the axis of rotation 38 via bearings 82 and 84 respectively.

The piston cage 72 serves not only to mount the pistons 30, 32, 34, and 36, but rather also to transmit the rotational movement from or to a drive/output shaft 86. For this purpose, the piston cage 72 is provided at its ends with in each case a set of outer teeth 88 and 90 respectively, of which at least one set, in the exemplary embodiment shown the set of outer teeth 88, meshes with a gear-wheel 92 connected to the output shaft 86. The output shaft 86 is, in the case of the oscillating piston engine 10, accordingly arranged on the axis of rotation 38 not coaxially, but rather extra-axially, thus facilitating the gas exchange control of the oscillating piston engine 10 to be described hereinafter.

For operating the oscillating piston engine 10 as an internal combustion engine, it is necessary that the working chambers 54 and 56, in which a fuel/air mixture is compressed and ignited and after ignition expanded, allow an exchange of gas, i.e. air and fuel must periodically be admitted into the working chambers 54 and 56 and combusted fuel/air mixture expelled again from the working chambers 54 and 56.

This requires gas exchange openings in the housing 12, which will be described hereinafter. In the case of the oscillating piston engine 10, the gas exchange openings are provided in the end faces 22 and 24 of the housing 12, i.e. in proximity to the axis of rotation 38, but eccentrically thereto.

As the oscillating piston engine 10 has two working chambers 54 and 56 which are however formed symmetrically to each other, the gas exchange openings in the end faces 22 and 24 are formed identically to one another apart from an offset through 180° about the axis of rotation 38, so only the gas exchange openings on the end face 22 of the housing 12 will be described hereinafter.

Figure 6:
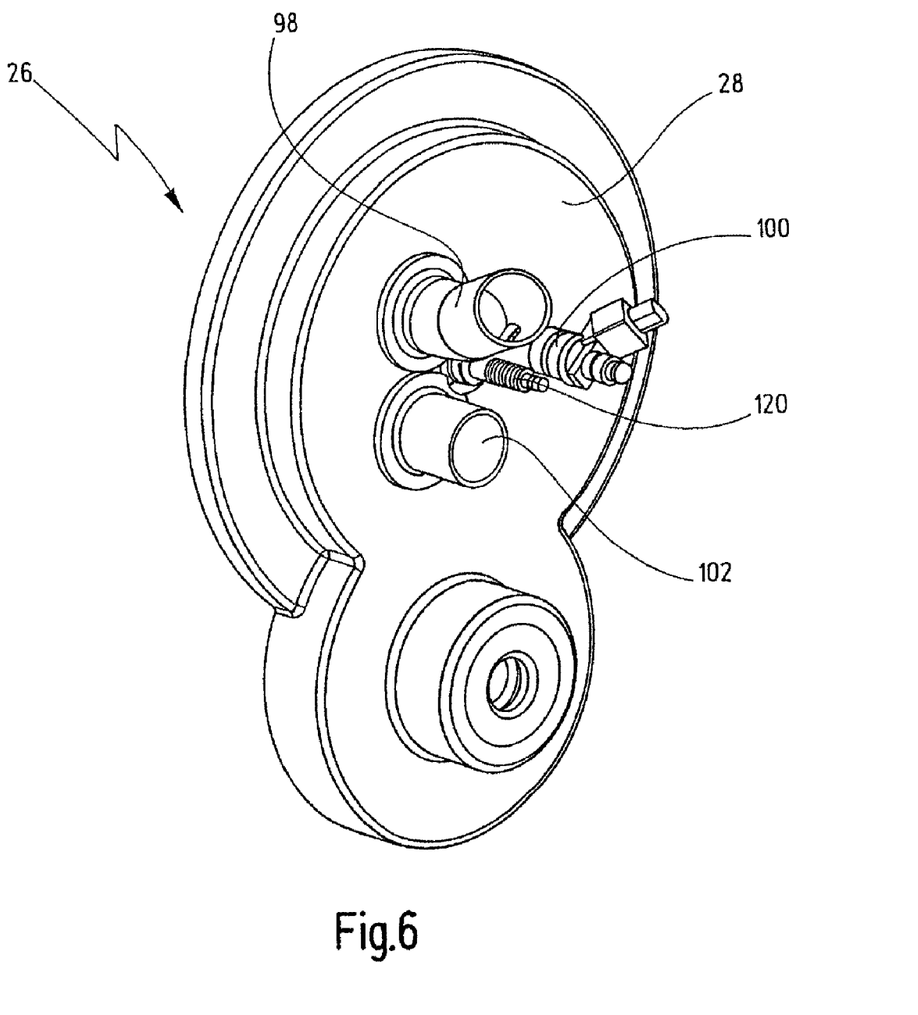
FIG. 6 is an external view of a housing part of the oscillating piston engine in FIG. 1 to 4.
Figure 7:
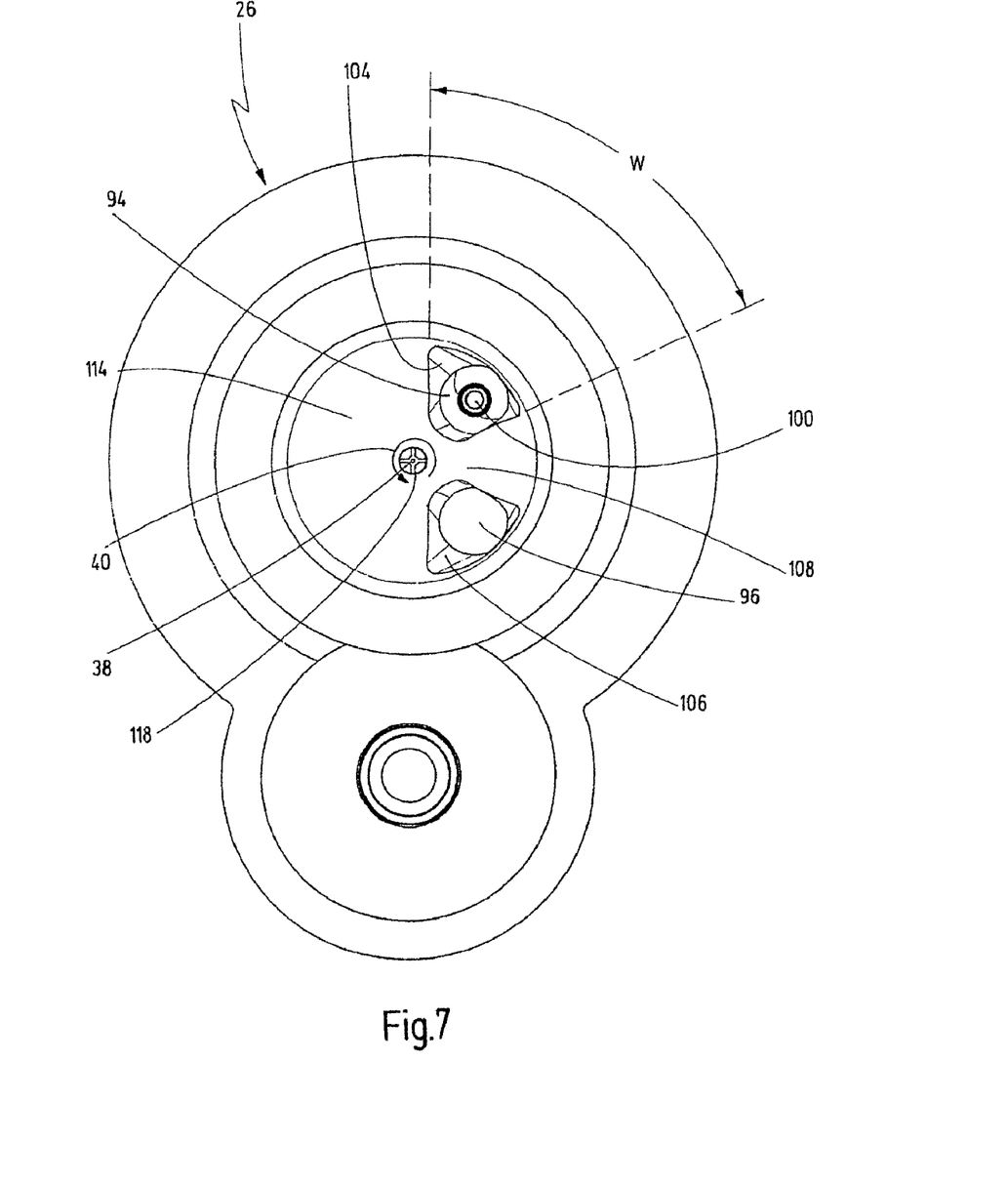
FIG. 7 is an internal view of the housing part in FIG. 6, on an enlarged scale compared to FIG. 6.

FIG. 7 is an internal view of the housing lid 26 forming the end face 22 of the housing 12, and FIG. 6 is an external view of the housing lid 26.

According to FIG. 7, a first gas exchange opening 94 and a second gas exchange opening 96 are formed in the end-face housing lid 26. The gas exchange opening 94 serves to admit gas, in the present case to admit combustion air into the working chamber 56, and the gas exchange opening 96 serves to discharge or expel a gas from the working chamber 56, in this case to expel combusted fuel/air mixture.

The gas exchange opening 94 has associated with it a connecting piece 98 which in the exemplary embodiment shown is combined with an injection nozzle 100 for injecting a fuel together with the combustion air into the working chamber 56. However, direct injection may also be provided for the oscillating piston engine 10, i.e. the injection nozzle 100 is then arranged separately from the connecting piece 98.

The gas exchange opening 96 has associated with it a connecting piece 102 which serves to connect the oscillating piston engine 10 to an exhaust system.

The gas exchange openings 94 and 96 are arranged on the end-face housing lid 28 eccentrically with respect to the axis of rotation 38. As is apparent from FIG. 7, the gas exchange openings 94 and 96 are not formed as bores passing through the end-face housing lid 28 with the same opening cross section, but rather widen from the outside to the inside of the end-face housing lid 28. The gas exchange opening 94 has for this purpose a cavernous or funnel-shaped recess 104, while the gas exchange opening 96 has a corresponding cavernous recess 106. The outline of the cavernous recesses 104 and 106 is approximately in the shape of a sector of a circle in its formation.

The cavernous depressions or recesses 104 and 106 respectively act as funnels for the respective admission of gas or discharge of gas.

A maximum clear width W of the gas exchange openings 94 and 96, more precisely the cavernous recesses 104 and 106, extends, viewed in the direction of revolution about the axis of rotation 38, over an angle of revolution of more than 30° and less than 90°. For the cavernous recesses 104 and 106, the angle of revolution in FIG. 7 is in each case approximately 70°.

The gas exchange openings 94 and 96 are separated from each other by a web 108.

The web 108 has, viewed in the direction of revolution about the axis of rotation 38, a smaller angular extension than the two cavernous depressions or recesses 104 and 106, in the present case of approximately 40°.

Viewed in the direction of revolution of the pistons 30, 32, 34, and 36 or of the piston cage 72 (arrow 40 in FIG. 7), the gas exchange opening 96 for discharging combusted fuel/air mixture is located before the gas exchange opening 94 for admitting the fresh fuel/air mixture. This makes allowance for the mode of operation of the oscillating piston engine 10 when performing the working strokes of expel-ling, drawing-in, compressing and expanding (working), as will be described hereinafter.

The gas exchange openings 94 and 96 in the end-face housing lid 26 of the end face 22 are one part of the gas exchange control of the oscillating piston engine 10. The other part of the gas exchange control of the oscillating piston engine 10 is performed by the piston cage 72. The piston cage 72 has an end face 110 which directly opposes the end-face housing lid 26 of the end face 22 of the housing 12 and is externally convexly arched in accordance with the internally concave configuration of the end-face housing lid 26, with the same radius of curvature. Present in the end face 110 of the piston cage 72 is an opening 112 which passes through the end face 110. In the exemplary embodiment shown, the opening 112 has an opening cross section having substantially the shape of a sector of a circle. The breadth or maximum width of the opening 112, viewed in the direction of revolution about the axis of rotation 38, is in this case smaller than the minimum breadth or width of the web 108 in the end-face housing lid 26. The opening 112 is, like the gas exchange openings 94 and 96, arranged eccentrically to the axis of rotation 38.

As the piston cage 72 revolves about the axis of rotation 38, the opening 112 sweeps the surface directly opposing it of the inside of the end-face housing lid 26 and, depending on the revolving position, the opening 112 sweeps successively the gas exchange opening 96 and the gas exchange opening 94 and obviously also the remaining closed region 114 of the surface of the end-face housing lid 26 that opposes the end face 110, including the web 108.

With the exception of the opening 112 and with the exception of a central opening 116, which is flush with a likewise central opening 118 in the end-face housing lid 26 and in which a spark plug or glow plug 120 is positioned, the end face 110 of the piston cage 72 is a full-area end face, i.e. is closed.

In order adequately to seal the gas exchange openings 94 and 96 from the end face 110 when specifically no gas is to be exchanged, i.e. when the opening 112 communicates neither with the gas exchange opening 94 nor with the gas exchange opening 96, a sealing arrangement 122 is provided, on the end face 110 of the piston cage 72 in the exemplary embodiment shown.

The sealing arrangement 122 has a radially outer ring seal 124, a radially inner ring seal 126 and a plurality of radially extending or radiantly arranged seals 128 which are arranged between and join together the radially inner ring seal 126 and the radially outer ring seal 124. The radially inner ring seal 126 produces a seal from the central opening 116, as does the radially outer ring seal 124 from the radially outer region of the end face 110 of the piston cage 72. Two of the radially extending seals 128, namely radially extending seals 130 and 132, surround in this case, together with the corresponding portion of the radially inner ring seal 126 and the radially outer ring seal 124, the opening 112 in the end face 110 of the piston cage 72.

All the above-mentioned seals 124, 126, 128, 130 and 132 of the sealing arrangement 122 are formed in one piece with one another and received in corresponding grooves in the outside of the end face 110 of the piston cage 72. The seals 124, 126, 128, 130 and 132 are in particular mounted in the aforementioned grooves resiliently, example via compression spring elements, so that the seals 124, 126, 128, 130 and 132 can be pressed against the inside of the end-face housing lid 26 by means of spring force.

Figure 8:
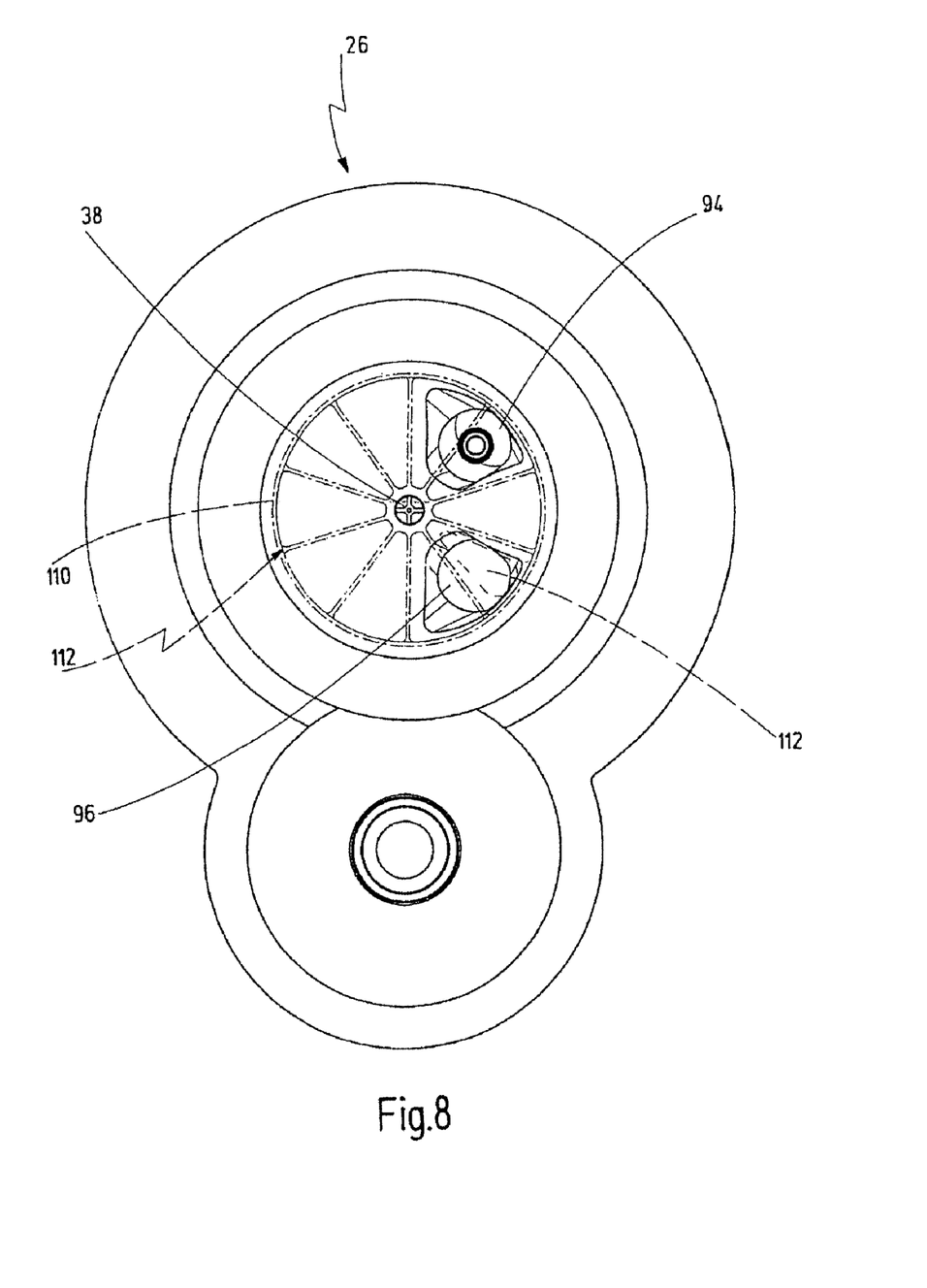
FIGS. 8, 9 and 10 are each a further internal view of the housing part as in FIG. 7, although an end face of the piston cage is additionally shown by broken lines in FIG. 5, and FIGS. 8, 9 and 10 each showing a differing revolving position of the piston cage in relation to the end-face housing part.
Figure 9:
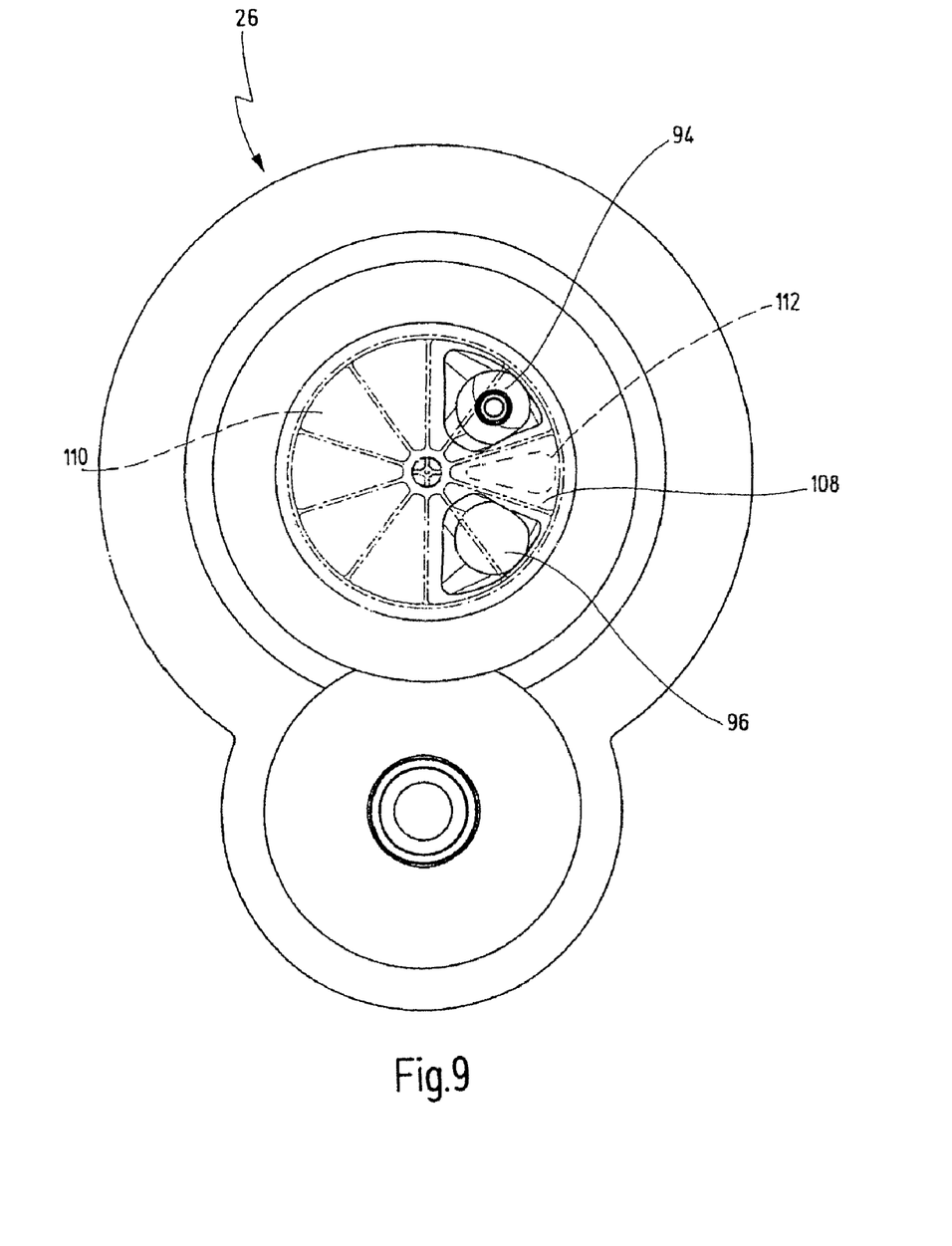
Figure 10:
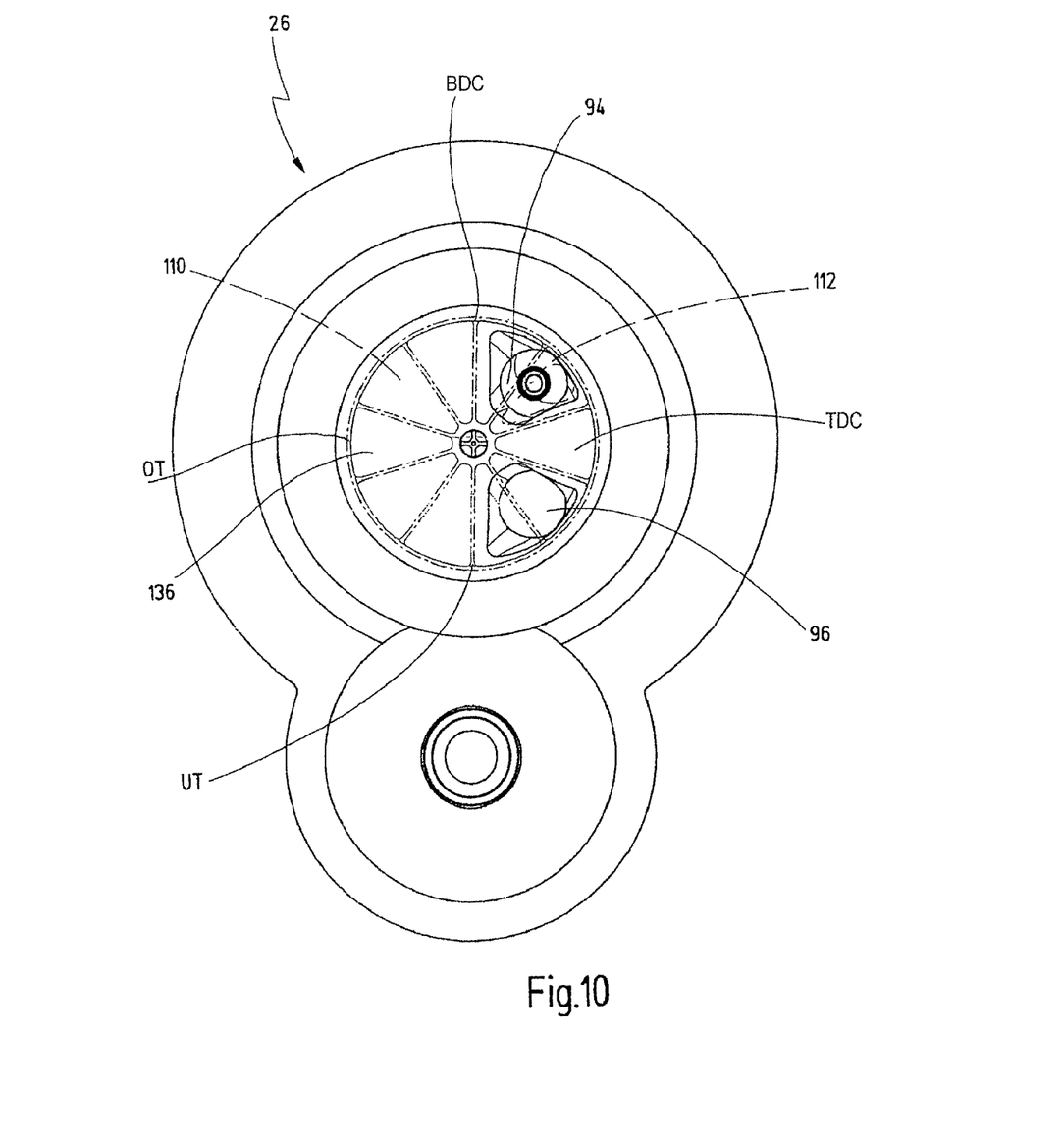

FIG. 8 to 10 show various relative positions between the opening 112 in the end face 110 of the piston cage 72 and the gas exchange openings 94 and 96 in the end-face housing lid 26.

Starting with FIG. 8, the piston cage 72 is located in a revolving position about the axis of rotation 38 in which the opening 112 communicates with the gas exchange opening 96. While the opening 112 sweeps the gas exchange opening 96, combusted fuel/air mixture is expelled from the working chamber 54. During this process, the pistons 30 and 32 pivot from the BDC position shown in FIG. 2 into the TDC position shown in FIG. 3 via the intermediate position shown in FIG. 4. For this pivoting stroke, the pistons 30 and 32 require a path of revolution of 90° about the axis of rotation 38. During the expulsion process, the gas exchange opening 94 is completely sealed from the working chamber 54 via the sealing arrangement 122.

Once the expulsion process has been terminated, or in the TDC position in FIG. 3, the opening 112 in the end face 110 of the piston cage 72 is flush with the web 108 of the end-face housing lid 26. In this state, both gas exchange openings 94 and 96 are sealed from the working chamber 54. After the TDC position according to FIG. 3, the pistons 30 and 32 again pivot apart from each other, into the BDC position according to FIG. 2 via the intermediate position according to FIG. 4, although the pistons in the renewed BDC position have continued to revolve through 180° about the axis of rotation 38 in relation to FIG. 2.

During the above-described pivoting-apart of the pistons 30 and 32, the opening 112 in the end face 110 of the piston cage 72 slides, as shown in FIG. 10, via the gas exchange opening 94, as a result of which fuel/air mixture is drawn into the working chamber 54 via the gas exchange opening 94. The process of admitting or drawing in the fuel/air mixture is carried out, again, over less than 90° of the revolving movement of the pistons 30 and 32 about the axis of rotation 38. Once the pistons 30 and 32 have reached their BDC position, the opening 112 is no longer flush with the gas exchange opening 94, and the working chamber 54 is now again completely sealed from the gas exchange openings 94 and 96.

From this renewed BDC position, the pistons 30 and 32 again pivot, imparted by the control cam 66, toward each other, as a result of which the previously admitted or drawn-in fuel/air mixture is compressed until the pistons 30 and 32 have returned to the TDC position. The opening 112 is located in this case approximately at the level of a point 136 in FIG. 10. The fuel/air mixture, which is now maximally compressed, is then ignited via the spark plug 120, and the ensuing expansion of the fuel/air mixture is then carried out during the renewed passing of the pistons 30 and 32 from their TDC position to their BDC position via a further 90° path of revolution about the axis of rotation 38.

During the working strokes of compressing and expanding (working), which overall take place over a path of revolution of 180° about the axis of rotation 38, the gas exchange openings 94 and 96 are tightly closed by the end face 110 of the piston cage 72 and the sealing arrangement 122. The gas exchange openings 96 and 94 open automatically as the opening 112 of the piston cage 72 passes the gas exchange openings 96 and 94.

In FIG. 10, the corresponding piston positions are denoted by "OT" (TDC) and "UT" (BDC).

While the control of the exchange of gas has been described hereinbefore with regard to the working chamber 54, it should be noted that the exchange of gas for the working chamber 56 is controlled in exactly the same way, without this requiring more detailed description in the present document. There is merely a time lag between the working strokes. Just while the working stroke of drawing in fresh fuel/air mixture is taking place in the working chamber 54, the expanding working stroke (working) takes place in the working chamber 56. When the expelling working stroke is taking place in the working chamber 54, the compressing working stroke takes place in the working chamber 56, etc.

The end surfaces of the pistons 30, 32, 34, and 36 have in their respective region facing the end face of the piston cage 72 a trough-like depression such as is denoted by reference numerals 140 and 142 for the pistons 30 and 32. The trough-like depressions 140 and 142, which are accordingly also provided on the pistons 34 and 36, cause a finite volume of the working chamber 54 still to remain in the TDC position of the pistons 30 and 32, as a result of which the pistons 30 and 32 are pressed apart from each other with optimum leverage on ignition of the fuel/air mixture which has just been compressed in the working chamber 54. According to FIG. 3, the pistons 30 and 32 each have associated with them, remote from the working chamber 54, backward chambers 150 and 152, the volume of which decreases in size when the working chamber 54 increases in size, and vice versa. The chambers 150 and 152 can be used as admission pressure chambers for precompressing combustion air as the pistons 30 and 32 swivel apart from each other, wherein in the BDC position of the pistons 30 and 32 the precompressed combustion air can then be injected into the pistons 30 and 32 via a valve arrangement (not shown) and, through said pistons, into the working chamber 54. Comparable backward chambers or preliminary pressure chambers can be provided accordingly for the pistons 34 and 36.

According to FIG. 1, an air inlet 154 and a corresponding air outlet 156 are also present on the housing 12, cooling air for the interior of the housing 12 being supplied via the air inlet 154 and discharged again via the air outlet 156. Also provided is a water inlet 158 via which cooling water for cooling the housing 12 itself can be admitted, the water then being discharged again via a water outlet 160.

An oil inlet 162 for lubricating and cooling the rotating parts of the oscillating piston engine 2, in particular the piston cage 72 and the pistons 30 32 34 and 36, and an oil outlet 164 are likewise provided on the housing 12.

What is claimed is:

1. An oscillating piston engine, comprising
   a housing having a center and having an end face,
   a first and at least a second piston arranged in said housing, said first and at least second piston having mutually facing end surfaces, said first and at least second piston being able to jointly revolve in said housing about an axis of rotation which is fixed in relation to said housing, and to perform, when revolving about said axis of rotation, reciprocating pivoting movements in opposite directions relative to one another about a pivot axis running through said center of said housing perpendicularly to said axis of rotation,
   a working chamber arranged in said housing between said mutually facing end surfaces of said first and at least second piston, said axis of rotation running through said working chamber,
   a piston cage arranged in said housing concentrically with said axis of rotation, said first and at least second piston being slidingly mounted in said piston cage, said piston cage being able to rotate together with said first and second piston about said axis of rotation, and at least one gas exchange opening arranged in said housing for admitting or discharging a gas into or from said working chamber, said at least one gas exchange opening being arranged eccentrically with respect to the axis of rotation on said end face of said housing, said axis of rotation running through said end face of said housing, said piston cage having an end face opposing said end face of said housing and having an eccentric opening delimited in direction of revolution about said axis of rotation.

2. The oscillating piston engine of claim 1, wherein said at least one gas exchange opening widens in opening cross section from an outside toward an inside of said end face of said housing.

3. The oscillating piston engine of claim 1, wherein a maximum clear width of said at least one gas exchange opening extends, viewed in the direction of revolution about said axis of rotation, over an angle of revolution of more than 30° and less than 90°.

4. The oscillating piston engine of claim 1, wherein said at least one gas exchange opening is a first gas exchange opening serving to discharge the gas from said working chamber, further comprising a second gas exchange opening arranged eccentrically on said end face of said housing and serving to admit a gas into said working chamber, said opening in said end face of said piston cage communicating when revolving about said axis of rotation successively, but without a time overlap, with said first and said second gas exchange opening.

5. The oscillating piston engine of claim 4, wherein said first gas exchange opening for discharging gas is arranged, viewed in direction of revolution of said piston cage, before said second gas exchange opening for admitting gas.

6. The oscillating piston engine of claim 4, wherein said first gas exchange opening and said second gas exchange opening are separated from each other, viewed in the direction of revolution of said piston cage, by a web which is at least slightly broader than a breadth of said opening of said piston cage, said web extending, viewed in direction of revolution, over an angle of from approximately 20° to approximately 60°.

7. The oscillating piston engine of claim 6, wherein said web extends over an angle of from approximately 30° to approximately 50°.

8. The oscillating piston engine claim 1, further comprising a sealing arrangement arranged between said end face of said housing and said end face of said piston cage and having at least one seal which seals said at least one gas exchange opening from said end face of said piston cage.

9. The oscillating piston engine of claim 8, wherein said sealing arrangement is provided on said piston cage and has a radially outer ring seal and at least two at least approximately radially extending seals which are set apart from one another in circumferential direction, are connected to said ring seals and arranged on both sides of said opening of said piston cage.

10. The oscillating piston engine of claim 9, wherein said sealing arrangement further has a radially inner ring seal.

11. The oscillating piston engine of claim 9, wherein said sealing arrangement has more than two at least approximately radially extending seals.

12. The oscillating piston engine of claim 11, wherein said radially extending seals are distributed uniformly about said axis of rotation in direction of revolution.

13. The oscillating piston engine of claim 1, wherein said end face of said housing has a further, centric opening, and said end face of said piston cage further has a centric opening.

14. The oscillating piston engine of claim 1, wherein said end surfaces of said first and at least second piston have a depression in a region facing said end face of said piston cage.

* * * * *